A. L. PACKARD.
ROCKER.
APPLICATION FILED JUNE 8, 1910.
983,758.
Patented Feb. 7, 1911.
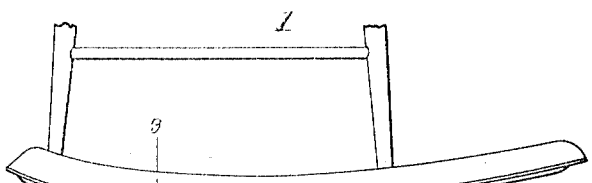
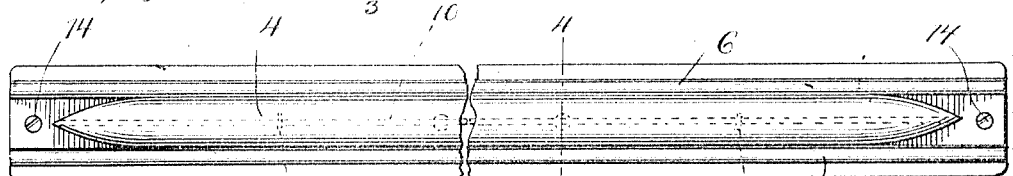
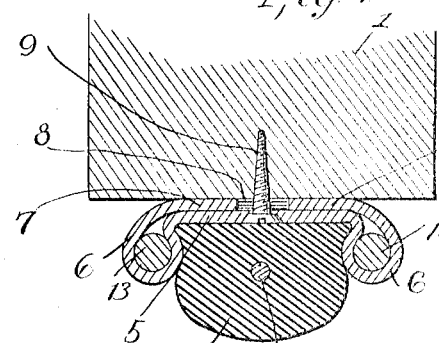
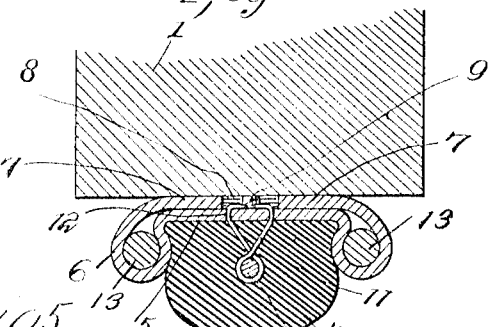
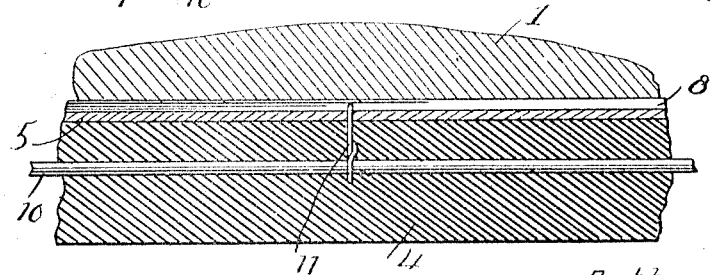
Witnesses
William Smith
E. Edwardsburgh
Inventor
Arthur L. Packard
By Victor J. Evans
Attorney

UNITED STATES PATENT OFFICE.

ARTHUR L. PACKARD, OF AUBURN, MAINE.

ROCKER.

983,758.

Specification of Letters Patent.

Patented Feb. 7, 1911.

Application filed June 8, 1910. Serial No. 565,702.

*To all whom it may concern:*

Be it known that I, ARTHUR L. PACKARD, a citizen of the United States, residing at Auburn, in the county of Androscoggin and State of Maine, have invented new and useful Improvements in Rockers, of which the following is a specification.

This invention relates to attachments for rocking chairs, cribs, hobby horses or the like and the object of the invention is the provision of a simple, cheap and efficient device which may be readily attached to the rockers of a crib, rocking chair or hobby horse with ease and which will prevent a rocker from slipping or marring the floor and which will act as a shock absorber and prevent jars when the device is used upon an uneven floor.

Further objects of the invention will appear as the following specific description is read in connection with the accompanying drawings which form a part of this application, and in which:

Figure 1 is a side elevation of a rocker. Fig. 2 is a detail bottom plan view thereof. Fig. 3 is a section taken on the line 3—3 of Fig. 1. Fig. 4 is a detail sectional view on the line 4—4 of Fig. 2. Fig. 5 is a longitudinal section on the line 5—5 of Fig. 2.

Referring more particularly to the drawing 1 represents the rocker and 2 the attachment which comprises a metallic securing strip 3 and a rubber tire 4 which is secured thereto in a manner which will hereinafter be described. The metallic securing strip is constructed by bending a flat piece of metal 5 into loops 6 at its sides and bringing the free edges 7 underneath the body 5 of the strip, leaving a strip 8 between the two for the passage of securing screws 9 which are adapted to enter the rocker 1.

The tire comprises the body 4 which is seated upon the plate 5 between the loops 6 which form lateral limiting members and passing through the center of the tire is a wire or rod 10 which is connected to the plate by wires 11 which pass through apertures 12 in the plate 5 and are wrapped around or looped over the rod 10. These connecting or fastening devices are arranged at intervals throughout the length of the rubber cushion and serve to freely hold said cushion or tire upon the rim. The tire tapers at its ends as shown in Figs. 1 and 2.

In order to reinforce the loops 6 heavy wires or rods 13 are passed through the same and are connected at their ends to the metallic strip by soldering or in any other suitable manner. The tires terminate short of the ends of the strip so as to permit the attaching screws 14 to be easy of access.

Having thus described the invention, what is claimed as new is;—

An attachment for rockers comprising a metallic rim having its sides bent into the form of loops and its side edges bent back parallel with the body, and leaving an opening between said edges, reinforcing members secured to the rim and lying in said loops, fastening devices passing through the opening and body to secure the rim to a rocker, a cushion tire mounted between the loops of the rim and having tapered ends, a reinforcing member therein, and connections from said tire reinforcing members and the rim which comprise single strands of wire looped around said reinforcing member passed through the body of the rim and twisted, said twisted portion lying in the opening between the edges.

In testimony whereof I affix my signature in presence of two witnesses.

ARTHUR L. PACKARD.

Witnesses:
 HAZEL L. ARRIS,
 A. A. ROBINSON.